United States Patent [19]
Hunkeler

[11] 3,842,477
[45] Oct. 22, 1974

[54] CUTTER BLADE CHANGING APPARATUS

[75] Inventor: Ernst J. Hunkeler, Fairport, N.Y.

[73] Assignee: The Gleason Works, Rochester, N.Y.

[22] Filed: Aug. 27, 1973

[21] Appl. No.: 391,710

[52] U.S. Cl............................. 29/200 D, 29/200 P
[51] Int. Cl....................... B23p 19/00, B23p 19/04
[58] Field of Search.......... 29/200 D, 200 P, 208 R, 29/200 R

[56] References Cited
UNITED STATES PATENTS
3,368,265  2/1968  Kirkham........................... 29/200 D
3,741,023  6/1973  Goebel et al..................... 29/200 D

*Primary Examiner*—Thomas H. Eager
*Attorney, Agent, or Firm*—Morton A. Polster

[57] ABSTRACT

A combination of apparatus for facilitating the replacement of cutting blades in a face mill-type cutter head. After sharpening, each blade is carefully positioned in a special cartridge adapted to be mounted to the cutter head and also adapted to be held by, and temporarily stored on, a blade-changing device, the cartridges being held on the blade-changing device in the same relative, precisely-spaced relationships in which the cartridges are to be ultimately mounted on the cutter head. When the replacement blades are needed, the blade-changing device is brought into contact with the face of the cutter head and is held temporarily in a proper orientation thereto with each cartridge properly aligned with its respective mounting unit. The operator then slips each cartridge, without the need for reorientation, from its temporary support on the blade-changing device onto the respective blade mounting units of the cutter head. The blades and mounting surfaces of the cartridges are protected from damage and contamination by the blade-changing device, and so the cartridges are easily loaded onto the cutter head and readily fixed in properly precise position.

16 Claims, 10 Drawing Figures

3,842,477

CUTTER BLADE CHANGING APPARATUS

BACKGROUND OF THE INVENTION

Recently, to meet the needs of Wankel engine manufacturing, a specialized machine has been developed for cutting the seal slots in the rotors for Wankel engines. This new machine includes a large cutter head of the face-mill type in which a relatively large number of cutting blades (approximately 30) are positioned in precisely-spaced relationships. The cutter head is relatively complex and includes individually-operated mounting units which are sequentially actuated to move the cutting blades axially relative to the face of the rotating cutter head into and out of cutting position in order to produce the desired "blind" seal slots required for the Wankel rotors.

Cutter blades for this slot-cutting machine must be changed regularly, and each such change requires the precise alignment of each blade in the cutter head. Since such alignment must be done to accuracies measured in a few ten-thousandths of an inch, blade changing has proved to be a relatively difficult and time-consuming operation. The purpose of the invention herein is to facilitate such blade changing with apparatus that can be handled in a relatively simple and expeditious manner.

BRIEF SUMMARY OF THE INVENTION

According to the invention herein, each axially-movable blade mounting unit of the cutter head on a slot-cutting machine is specially designed to include a cantilever element or post for receiving a novel cartridge in which at least one cutting blade is mounted. Each cartridge includes a hollow channel for receiving the cantileaver element or post of the blade mounting unit, and this combination is designed so that, when the cartridge is properly seated, the radial position of each blade relative to the cutter head is accurate to tolerances as close as 0.0002". To facilitate changing cutter-blade cartridges in this cutter head, the invention provides a device having a base member to which are fixed a plurality of cantilever posts adapted to receive and support cartridges for blades and to hold them in the same precisely-spaced relationships in which the cartridges are positioned on the cutter head. The base member also carries guides which cooperate with at least two predetermined orientation points on the cutter head to exactly align the blade-changing device relative to the cutter head.

Means are also provided for releasably locking the blade-changing device to the face of the cutter head when the device has been placed in properly-oriented contact with the cutter head. Those skilled in the art will appreciate that this proper orientation must be sufficiently accurate to align the hollow channel of each cartridge with the cantilever element of a respective one of the blade mounting units of the cutter head.

In conjunction with each cantilever post of the blade-changing device, the base member includes a respective guideway through which a push rod may be moved to slide a cartridge from the blade-changing device onto the cutter head. When locked in properly-oriented contact with the face of the cutter head, the blade-changing device of the invention aligns each cartridge in precise relation to the cutter head and maintains this alignment as the cartridge is slipped, without reorientation, from the cantilever posts of the changing device onto the cantilever elements of the cutter head. In the preferred embodiment of the invention, the cantilever posts of both the blade-changing device and of the cutter head each have similar predetermined cross sections, and only a single hollow channel in the cartridge cooperates with both of these posts.

As with known systems in which cutter blades are mounted in cartridge elements, blades are sharpened and precisely fitted into respective cartridges at some place remote from the slot-cutting machine. The cartridges are then cleaned and loaded onto the cantilever posts of the novel blade-changing device to be ready for quick mounting onto the cutter head of the machine when needed. Until the sharpened blades are needed, the blade-changing device acts as a temporary storage unit which protects the precisely-positioned blades and prevents contamination of the cartridges' hollow channels which must remain free of dirt to assure proper alignment when transferred to the cutter head. Since it is not necessary for the operator to pick-up, clean off, and then manually align each individual cartridge, the subject invention not only greatly simplifies blade replacement but also expedites the process to minimize the loss of production time due to dropped and/or dirty cartridges.

In describing the invention in detail, reference will be made to the drawings in which.

DETAILED DESCRIPTION

Figure 1:
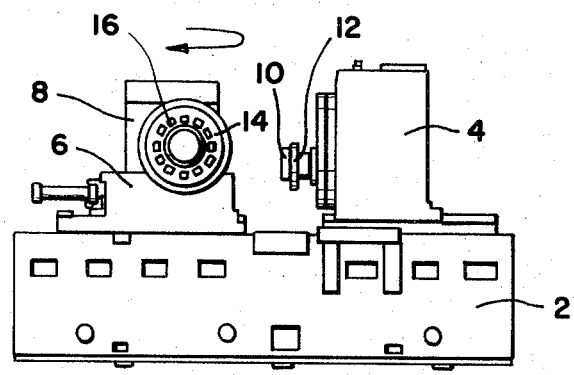
FIG. 1 is a front view of a slot-cutting machine having a face-mill cutter head of the type with which the blade-changing device of the invention is adapted to cooperate.

The blade-changing device of the invention is designed for use with the machine shown in general outline in FIG. 1. The machine's basic elements are a frame 2 supporting a workhead 4 and a column 6 which, in turn, supports a cutter head housing 8. The workhead 4 holds a workpiece 10 (a Wankel engine rotor) in an arbor 12 during the slot machining operation. Within housing 8 is a spindle for driving a face mill-type cutter head 14.

As many as thirty blades are mounted on cutter head 14, each blade being carried in a cartridge 16 individually fastened to a cantilever element 19 (shown in FIGS. 4 et seq.) protruding out of the face of cutter head 14. Each cantilever element 19 is part of a mounting unit 18 which is moved in and out axially of the cutter head to produce the desired "blind" slot in the workpiece 10. As shown, column 6 is pivoted 90° from its normal cutting position to a special position for changing the cutting blades.

Figure 2:
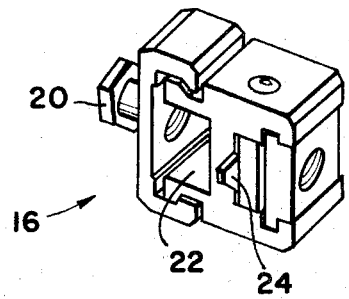
FIG. 2 is a perspective view of the cutter blade cartridge which is loaded onto a cutter head by the blade changing device.

Each cutter-blade cartridge 16, detailed in FIG. 2, is removably fastened to cutter head 14 by a lock screw 20 which clamps the walls of a hollow channel 22 to a respective cantilever post 19. In the manner known in the art, a cutting blade 24 extends from each cartridge 16 a distance sufficient to cut the desired slot in the end of the rotor workpiece 10.

Since cartridges 16 must be replaced whenever the cutting blades become dull or broken, changing of cartridges is a relatively frequent occurrence and, when done "free hand," is a time-consuming task due to the difficulty of preventing dirt from getting between the cantilever posts 19 and the hollow channels 22 and due to the extreme care which must be exercised to prevent damage to, or misalignment of, blades because of accidental dropping or other mishandling of cartridges. The subject invention facilitates cutter replacement with the blade-changing device 26 (illustrated in perspective in FIG. 3) which comprises a cylindrical base 28 having four evenly spaced radial projections 30 for supporting four guide members 32.

At the larger end of each guide member 32 is a flange 34 which provides a surface for mounting the guide members 32 to the base 28 with four cap screws 36 per member. At the unsupported end of each guide member 32, a shoulder 38 is provided for cooperation with four orientation points 40 (see FIGS. 4 and 5) fixed to the face surface of cutter head 14 to properly position blade-changing device 26 relative to cutter head 14 during the blade changing operation.

Two oppositely-disposed guide members 32 include well known releasable locking pins 42 which are used to latch the entire blade-changing device 26 to the cutter head 14 in the manner shown in FIG. 6 and explained in greater detail below. The remaining two oppositely-disposed guide members 32 are used for purposes of guiding and stabilizing blade-changing device 26 when it is being mounted temporaly to a cutter head.

Figure 3:
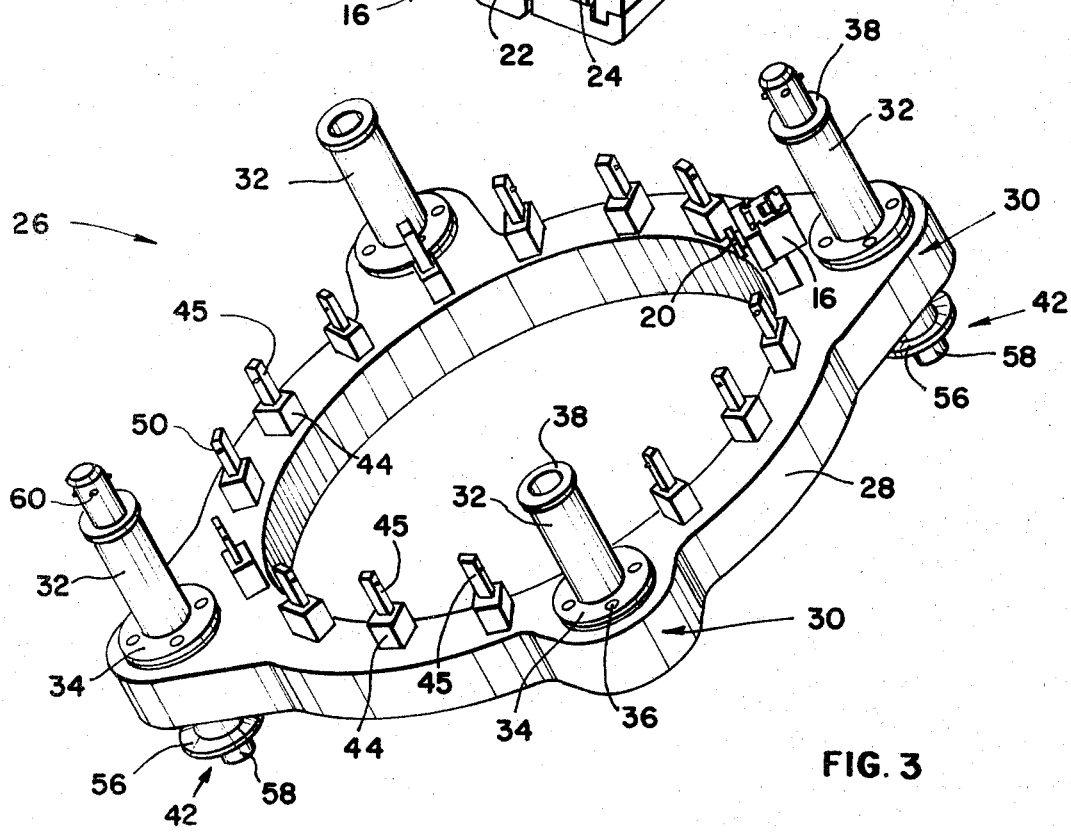
FIG. 3 is a perspective view of the blade-changing device of the invention showing only a single cartridge mounted thereon.

Still referring to FIG. 3, a plurality of supports 44 are evenly spaced and mounted around the inner face portion of circular base 28. The outer-most portion of each support 44 is a cantilever post 45 preferably having a rectangular cross-sectional shape which provides flat surfaces to cooperate with the interior surfaces of channel 22 of each cartridge 16. One cartridge 16 is shown mounted to a cantilever post 45 at the upper right side of FIG. 3, being held in an "upside down" position (shown enlarged in FIG. 6) with its cutting blade 24 sheathed for protection in a recess 48 in support 44.

Figure 5:
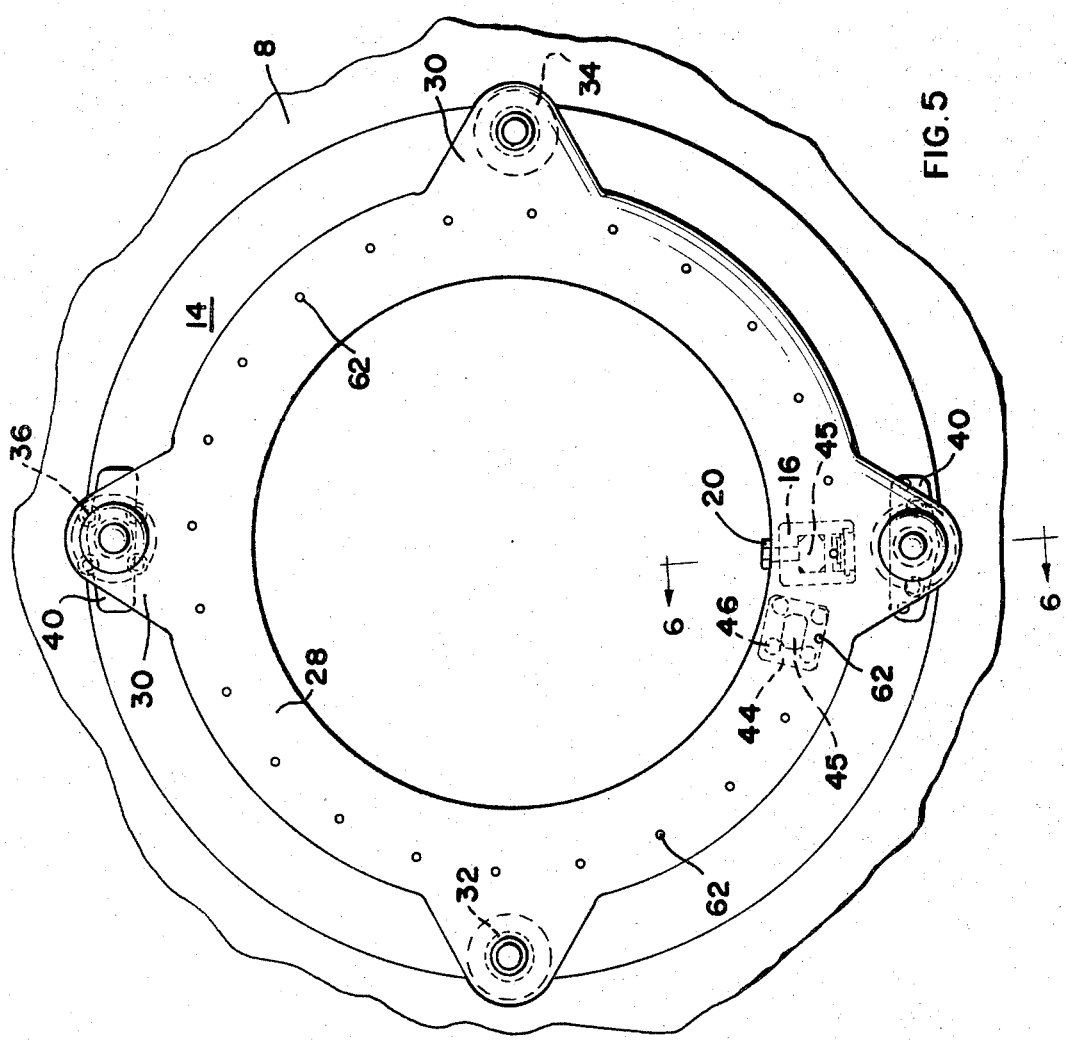
FIGS. 4 and 5 are end and top views, respectively, of the device shown in FIG. 3 with repetitious parts being removed to simplify both the drawings and the explanation.
Figure 4:
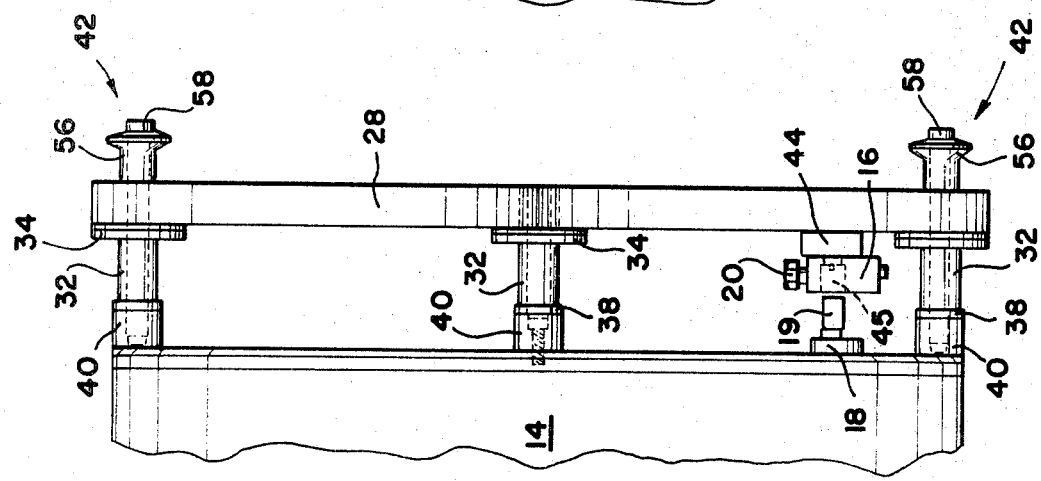
Figure 6:
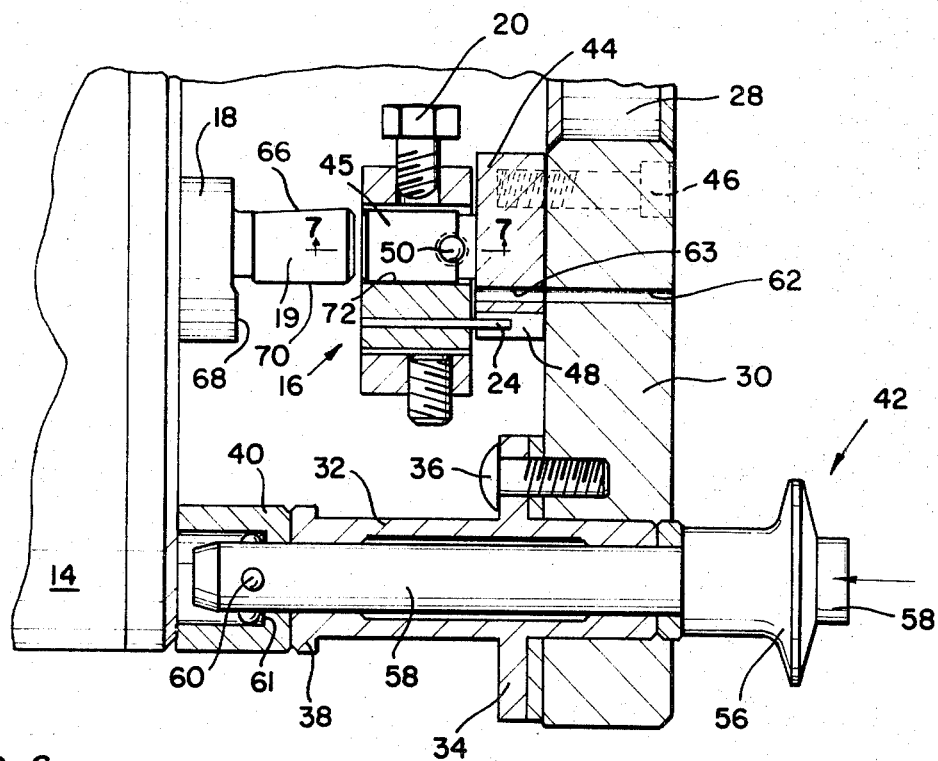
FIG. 6 is an enlarged view taken along the plane 6—6 in FIG. 5, of one guide member portion with releasable locking means, showing cantilever posts of both the device and a cutter head, as well as a blade-carrying cartridge mounted on the cantilever post of the blade-changing device.

In FIGS. 4, 5 and 6, blade-changing device 26 is shown latched to the face of cutter head 14 in a properly-oriented position for sliding cutter-blade sets onto the cantilever elements 19 of respective mounting units 18. Again, only one cartridge is illustrated for purposes of clarity. As seen at the top and bottom of FIG. 4, two orientation points 40 are used to latch blade-changing device 26 temporarily to the face of cutter head 14 in a manner explained below. The other pair of oppositely-disposed orientation points 40 is used as further support and prevent blade-changing device 26 from tipping when being mounted. In this properly-oriented position, each cartridge 16 is held by the cantilever post 45 of a respective support 44 in exact alignment with a cantilever element 19 of a respective mounting unit 18 in position to be readily transferred to the cutter head 14.

Associated with each support 44 and aligned with each other, are a pair of guide ways 62 and 63 which provide openings through base 28 and support 44, respectively, to receive and direct a push rod 64 in an operation which will explained below with reference to FIGS. 8–10.

Figure 7:
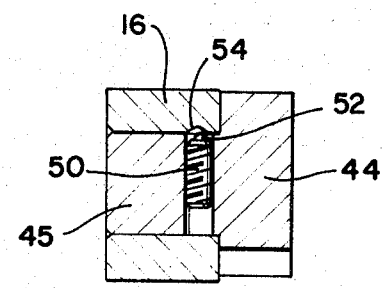
FIG. 7 is a detailed view, taken along the plane 7—7 in FIG. 6, showing detent means for releasably securing cartridges to the cantilever post of the blade-changing device.

Referring particularly to the enlarged section view in FIG. 6, cartridge 16 is temporarily held to cantilever post 45 by means of a self-locking detent 50 centrally located within cantilever post 45. This detent arrangement is more clearly shown in FIG. 7, and its function is to provide a simple means for holding cartridge 16 in place until it is transferred to the cutter head. As can be seen, detent 50 comprises a spring-loaded ball 52 which forcefully protrudes into a cooperating groove 54 located on one inner surface of channel 22 of cartridge 16.

An operator positions blade-changing device 26 on the face of cutter head 14 by gripping a pair of handles 56 which are attached to releasable locking pins 42 (see FIGS. 3, 4 and 6). The operator lines up the four guide members 32 with their mating orientation points 40 and, with his thumbs, pushes two respective actuators 58 to force the lower male portion of each locking pin 42 into the female portion of a respective orientation point 40. Upon release of actuators 58, four spring-loaded balls 60 snap out of the male portion of each locking pin 42, locking the blade-changing device 26 in its properly-oriented position. The balls 60, being firmly retained by a flange 61 of orientation point 40, hold changing device 26 in position while the operator transfers the cutter-blade cartridges to the cutter head in a manner which will next be described.

Figure 8:
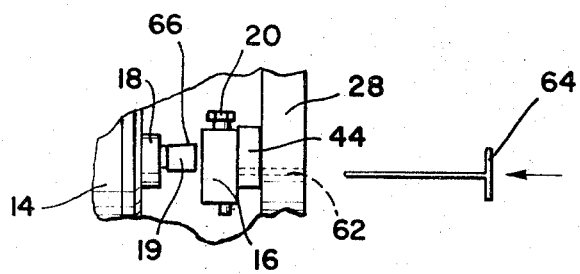
FIGS. 8, 9 and 10 illustrate the sliding of a cartridge from the changing device to the cutter head.
Figure 9:
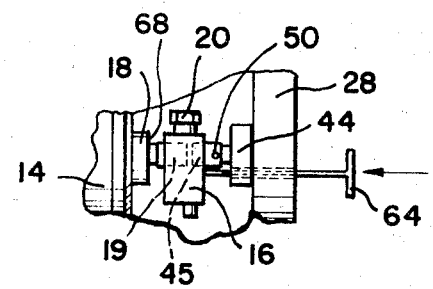
Figure 10:
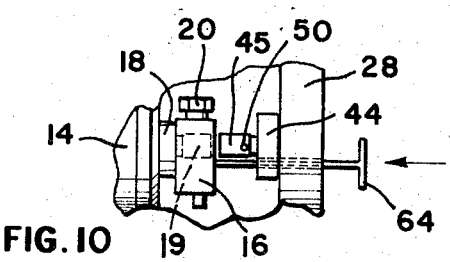

FIGS. 8–10 illustrate, at three sequential times, the transfer of a cartridge 16 from a cantilever post 45 of the blade-changing device 26 to a cantilever element 19 of cutter head 14. As mentioned above, each guideway 62, located in base 28, is in line with a respective guideway 63 located in each support 44, the guideways being adapted to receive and direct the end of a push rod 64 which the operator uses to contact cartridge 16 and to slip it off cantilever post 45 and onto the cantilever element 19 of a respective mounting unit 18 of the cutter head.

FIG. 8 shows cartridge 16 ready for loading with push rod 64 being held in its initial position by the operator.

FIG. 9 illustrates the apparatus at a mid-point during the transfer operation. At this time, the operator has moved push rod 64 through both guideways 62 and 63 and has started to slide the cartridge partially off cantilever post 45 and onto cantilever element 19. By virtue of the novel combination of apparatus just described above, this transfer is accomplished with relative ease and speed, and without requiring the operator to readjust the orientation of the cartridge, even though the cleaance between the unclamped surfaces of hollow channel 22 and the flat surfaces of cantilever element 19 is quite small.

FIG. 10 illustrates the apparatus at the time when the operator has moved push rod 64 all the way in, sliding cartridge 16 onto cantilever element 19 so that it is seated against a face surface 68 of mounting unit 18. Thereafter, push rod 64 is withdrawn and the operator locks cartridge 16 onto mounting unit 18 by tightening lock screw 20. Due to the taper of one surface 66 of cantilever element 19, the tightening of lock screw 20 forces cartridge 16 to seat firmly against face surface 68 of mounting unit 18 while, at the same time, exact radial adjustment of cartridge 16 is achieved by firm contact between mating plane surfaces 70 and 72 accurately machined on cantilever element 19 and cartridge 16, respectively (see FIG. 6).

After transferring one or more cartridges, the operator indexes cutter head 14 by depressing a foot pedal arrangement (not shown) at the base of frame 2 of the machine, and the procedure described above is repeated. After all of the cartridges have been transferred and locked into place on the cutter head, the operator depresses actuators 58 of locking pins 42 to release the balls 60, and blade-changing device 26 is removed from the face of the cutter head which is now ready to resume the cutting operation.

Having described the invention herein in terms of the preferred apparatus, it should be understood that the invention can be practiced as well with different configurations of cartridges (e.g., multi-bladed), cantilever supports (e.g. oval), mounting units (e.g. female elements for receiving and holding cartridges in the cutter head), alignment means (orientation points on cutter head could be male members cooperating with female elements on blade-changing device), etc.

What is claimed is:

1. A combination for changing blades in a face-mill type cutter head, said blades being removably held in cartridges, and said cutter head having mounting means
   for receiving a plurality of said cartridges, and
   for holding the cartridges so that the cutting edges of said blades extend above the face surface of the cutter head and are oriented in predetermined precisely-spaced relationship, said combination including a blade-changing device comprising:
   a base member;
   a plurality of supporting means spacially oriented on said base member, said supporting means being adapted to receive and support said cartridges in a spaced relationship corresponding to the relationship in which said cartridges are held on said cutter head; and
   alignment means for cooperatively engaging said cutter head when moved into properly-oriented contact therewith to position said supporting means in predetermined relationship to the mounting means of the cutter head,
   whereby, when said blade-changing device is in properly-oriented contact with the cutter head, cartridges supported by respective ones of said supporting means may be slipped, without reorientation, from said supporting means onto the mounting means of said cutter head.

2. The combination of claim 1 wherein each said supporting means of the blade-changing device comprises a cantilever post mounted to said base member by one end.

3. The combination of claim 2 wherein each cantilever post has a predetermined cross-sectional shape and wherein each cartridge adapted for cooperation therewith includes a hollow channel portion into which the unsupported end of a cantilever post can be received.

4. The combination of claim 2 wherein the mounting means of said cutter head comprises a plurality of cantilever elements, each mounted to the cutter head by one end.

5. The combination of claim 4 wherein each cantilever element has a predetermined cross-sectional shape and each cartridge adapted for cooperation therewith includes a hollow channel portion into which the unsupported end of a cantilever element can be received.

6. The combination of claim 5 wherein said cross-sectional shape includes at least one flat plane surface and said cartridge includes a mating flat plane surface.

7. the combination of claim 5 wherein each cantilever post mounted to the base member has substantially the same cross-sectional shape as each corresponding cantilever element mounted to the cutter head, and each cooperating cartridge has at least one hollow channel capable of receiving the unsupported ends of either or both cantilever posts and cantilever elements.

8. The combination of claim 1 wherein said supportizg means of the blade-changing device include means for releasably holding cartridges supported thereon.

9. The combination of claim 8 wherein said releasable holding means comprise detent means.

10. The combination according to claim 1 wherein said cutter head includes at least two orientation points and said alignment means comprises a plurality of spaced guide members, at least two of said guide members cooperatively engaging said orientation points when said blade-changing device and cutter head are properly oriented for slipping cartridges therebetween.

11. The combination according to claim 1 wherein said alignment means further comprises releasable locking means, operable only when said blade-changing device is properly aligned with the cutter head, for maintaining said blade-changing device in temporary fixed position relative to the cutter head.

12. The combination according to claim 10 wherein at least one guide member includes releasable locking means for maintaining said blade-changing device in temporary fixed position relative to the cutter head when the guide members are cooperatively engaged with the orientation points.

13. The combination of claim 1 further comprising means for moving cartridges from said supporting mmeans to said receiving means when said blade-changing device and cutter head are in properly-oriented contact.

14. the combination of claim 13 wherein said moving means comprises a plurality of guideways in said base member corresponding, respectively, with each supporting means, and at least one push rod movable in each guideway for engagement with a cartridge for sliding the cartridge from the respective supporting means on to the cutter head.

15. The combination of claim 1 wherein said blade-changing device further comprises sheathing means for protecting the cutting blades held by cartridges being supported by respective ones of said supporting means.

16. The combination of claim 15 wherein said sheathing means comprises a recess in each supporting means for receiving the blades of cartridges supported thereby.

* * * * *